US010733240B1

(12) United States Patent
Callahan

(10) Patent No.: US 10,733,240 B1
(45) Date of Patent: Aug. 4, 2020

(54) PREDICTING CONTRACT DETAILS USING AN UNSTRUCTURED DATA SOURCE

(71) Applicant: Jonathan Callahan, Campbell, CA (US)

(72) Inventor: Jonathan Callahan, Campbell, CA (US)

(73) Assignee: Intuit Inc., Mountain View, CA (US)

( * ) Notice: Subject to any disclaimer, the term of this patent is extended or adjusted under 35 U.S.C. 154(b) by 387 days.

(21) Appl. No.: 15/667,590

(22) Filed: Aug. 2, 2017

(51) Int. Cl.
| G06F 16/93 | (2019.01) |
| G06Q 50/18 | (2012.01) |
| G06F 3/0484 | (2013.01) |
| G06Q 10/06 | (2012.01) |
| G06Q 10/10 | (2012.01) |
| G06F 40/295 | (2020.01) |

(52) U.S. Cl.
CPC .......... G06F 16/93 (2019.01); G06F 3/04847 (2013.01); G06F 40/295 (2020.01); G06Q 10/067 (2013.01); G06Q 10/10 (2013.01); G06Q 50/188 (2013.01)

(58) Field of Classification Search
CPC .... G06F 16/93; G06F 40/295; G06F 3/04847; G06Q 10/10; G06Q 10/067; G06Q 50/188
See application file for complete search history.

(56) References Cited

U.S. PATENT DOCUMENTS

| 7,676,400 | B1* | 3/2010 | Dillon | G06Q 30/02 |
| | | | | 705/26.7 |
| 7,970,767 | B2* | 6/2011 | Probst | G06F 17/241 |
| | | | | 707/739 |
| 8,386,486 | B2* | 2/2013 | Zhang | G06F 16/90 |
| | | | | 707/737 |
| 8,392,288 | B1* | 3/2013 | Miller | G06Q 40/02 |
| | | | | 705/26.1 |
| 9,443,226 | B2* | 9/2016 | Berry | G06Q 10/107 |
| 9,507,830 | B2* | 11/2016 | Chang | G06F 16/24578 |
| 2007/0208728 | A1* | 9/2007 | Zhang | G06F 16/337 |

(Continued)

OTHER PUBLICATIONS

Shah, P., "How to create an Invoice automatically from PO in Oracle Apps R12", <http://oraclemine.com/create-an-invoice-automatically-from-po/>, published on Feb. 18, 2016 (5 pages).

(Continued)

*Primary Examiner* — Miranda Le
(74) *Attorney, Agent, or Firm* — Ferguson Braswell Fraser Kubasta PC

(57) ABSTRACT

A method may include extracting first entities from a first portion of an unstructured data source associated with a user, obtaining, based on the first entities, a contract model including elements and a contract type, generating, by applying the contract model to the first entities, a proposed contract including a contract score and, for each element, element values. Each element value may include an element value score. The method may further include identifying a structured data source associated with the user, obtaining, from the structured data source, structured data corresponding to the first entities, correlating the structured data with an element value of the proposed contract, and modifying, by applying the contract model to the structured data, the element value score of the element value.

17 Claims, 12 Drawing Sheets

(56) References Cited

U.S. PATENT DOCUMENTS

| | | | | |
|---|---|---|---|---|
| 2008/0255972 A1* | 10/2008 | Ulrich | ................... | G06Q 30/04 |
| | | | | 705/34 |
| 2013/0035985 A1* | 2/2013 | Gilbert | ............. | G06Q 10/06375 |
| | | | | 705/7.31 |
| 2015/0356601 A1* | 12/2015 | Lu | ...................... | G06Q 30/0255 |
| | | | | 705/14.53 |

OTHER PUBLICATIONS

"The Smartest Invoice You'll Ever Send", <https://www.and.co/invoicing>, AND CO, Sep. 2, 2016 (7 pages).

\* cited by examiner

Email System 400

First Email Thread 402

| From: Mike Jones | April 15, 2017 | "like to purchase a red sweater and a blue sweater" |
|---|---|---|
| To: Mike Jones | April 16, 2017 | "please confirm order: 2 sweaters @ $50 each" |
| From: Mike Jones | April 18, 2017 | "running any promotions?" |
| From: Mike Jones | April 18, 2017 | "maybe a jacket would be better" |
| To: Mike Jones | April 19, 2017 | "10% discount off list price" |

First Set of Entities 404

| Mike Jones 406 | Sweater 408 | red | blue | order |
|---|---|---|---|---|
| 2 | $50 | jacket | 10% | discount |

FIG. 4A

Proposed Invoice 430

Line Item: Sweater 432A

| Element Value Score: .7 434A | Price: $50 436A | Quantity: 2 436B |

Line Item: Jacket 432B

| Element Value Score: .4 434B | Price: $90 436C | Quantity: 1 436D |

Customer: Mike Jones 432C

| Element Value Score: .9 434C | Address: 23 Maple 436E | mike@jones.com 436F |

Terms 432D

| Element Value Score: .7 434D | Due Date: 9/15/17 436G | Discount: 10% 436H |

Balance: $100
432E

Invoice Score: .8
438

Discount: 10%
436H

Attribute Value Score: .7
440

FIG. 4C

Proposed Invoice 430

Line Item: Sweater 432A
| Element Value Score: .9 434A | Price: $50 436A | Quantity: 2 436B |

Line Item: Jacket 432B
| Element Value Score: .4 434B | Price: $90 436C | Quantity: 1 436D |

Customer: Mike Jones 432C
| Element Value Score: .9 434C | Address: 23 Maple 436E | mike@jones.com 436F |

Terms 432D
| Element Value Score: .7 434D | Due Date: 9/15/17 436G | Discount: 10% 436H |

Balance: $100 432E

Invoice Score: .6 438

Discount: 10% 436H
Attribute Value Score: .7 440

FIG. 4E

Email System 400

Prior Email Thread 472

| From: Mike Jones | July 10, 2016 | "like to purchase a sweater" |
|---|---|---|
| To: Mike Jones | July 11, 2016 | "please confirm order of a sweater @ $50" |
| From: Mike Jones | July 12, 2016 | "any discounts available?" |
| To: Mike Jones | July 13, 2016 | "sorry, no discounts at this time" |

Second Set of Entities 474

| Mike Jones 406 | Sweater 408 | order | $50 | discount |
|---|---|---|---|---|

FIG. 4F

PREDICTING CONTRACT DETAILS USING AN UNSTRUCTURED DATA SOURCE

BACKGROUND

Small business owners often communicate with their customers via email messages and send invoices to their customers based on the contents of the email messages. Often, a small business owner will copy and paste information from an email thread into an invoice, which may be time-consuming and may also create errors in the invoice. Similar issues may arise when sending contracts and/or agreements of any sort based on the contents of an unstructured data source (e.g., a data source that includes expressions represented in natural language) via an electronic communication medium.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including extracting first entities from a first portion of an unstructured data source associated with a user, obtaining, based on the first entities, a contract model including elements and a contract type, generating, by applying the contract model to the first entities, a proposed contract including a contract score and, for each element, element values. Each element value includes an element value score. The method further includes identifying a structured data source associated with the user, obtaining, from the structured data source, structured data corresponding to the first entities, correlating the structured data with an element value of the proposed contract, and modifying, by applying the contract model to the structured data, the element value score of the element value.

In general, in one aspect, one or more embodiments relate to a system including a computer processor, an unstructured data source associated with a user, structured data sources associated with the user, a natural language processor executing on the computer processor configured to extract first entities from a first portion of the unstructured data source, and a contract generator executing on the computer processor configured to obtain, based on the first entities, a contract model including elements and a contract type, generate, by applying the contract model to the first entities, a proposed contract including a contract score and, for each element, element values. Each element value includes an element value score. The contract generator is further configured to identify a first structured data source of the structured data sources, obtain, from the first structured data source, structured data corresponding to the first entities, correlate the structured data with an element value of the proposed contract, and modify, by applying the contract model to the structured data, the element value score of the element value. The system further includes a repository configured to store at least the contract model and the proposed contract.

In general, in one aspect, one or more embodiments of the invention relate to a non-transitory computer readable medium including instructions that, when executed by a computer processor, perform a method including extracting first entities from a first portion of an unstructured data source associated with a user, obtaining, based on the first entities, a contract model including elements and a contract type, generating, by applying the contract model to the first entities, a proposed contract including a contract score and, for each element, element values. Each element value includes an element value score. The method further includes identifying a structured data source associated with the user, obtaining, from the structured data source, structured data corresponding to the first entities, correlating the structured data with an element value of the proposed contract, and modifying, by applying the contract model to the structured data, the element value score of the element value.

Other aspects of the invention will be apparent from the following description and the appended claims.

BRIEF DESCRIPTION OF DRAWINGS

FIG. 4A, FIG. 4B, FIG. 4C, and FIG. 4D show examples in accordance with one or more embodiments of the invention.

FIG. 4E, FIG. 4F, and FIG. 4G show examples in accordance with one or more embodiments of the invention.

DETAILED DESCRIPTION

Figure 1A:
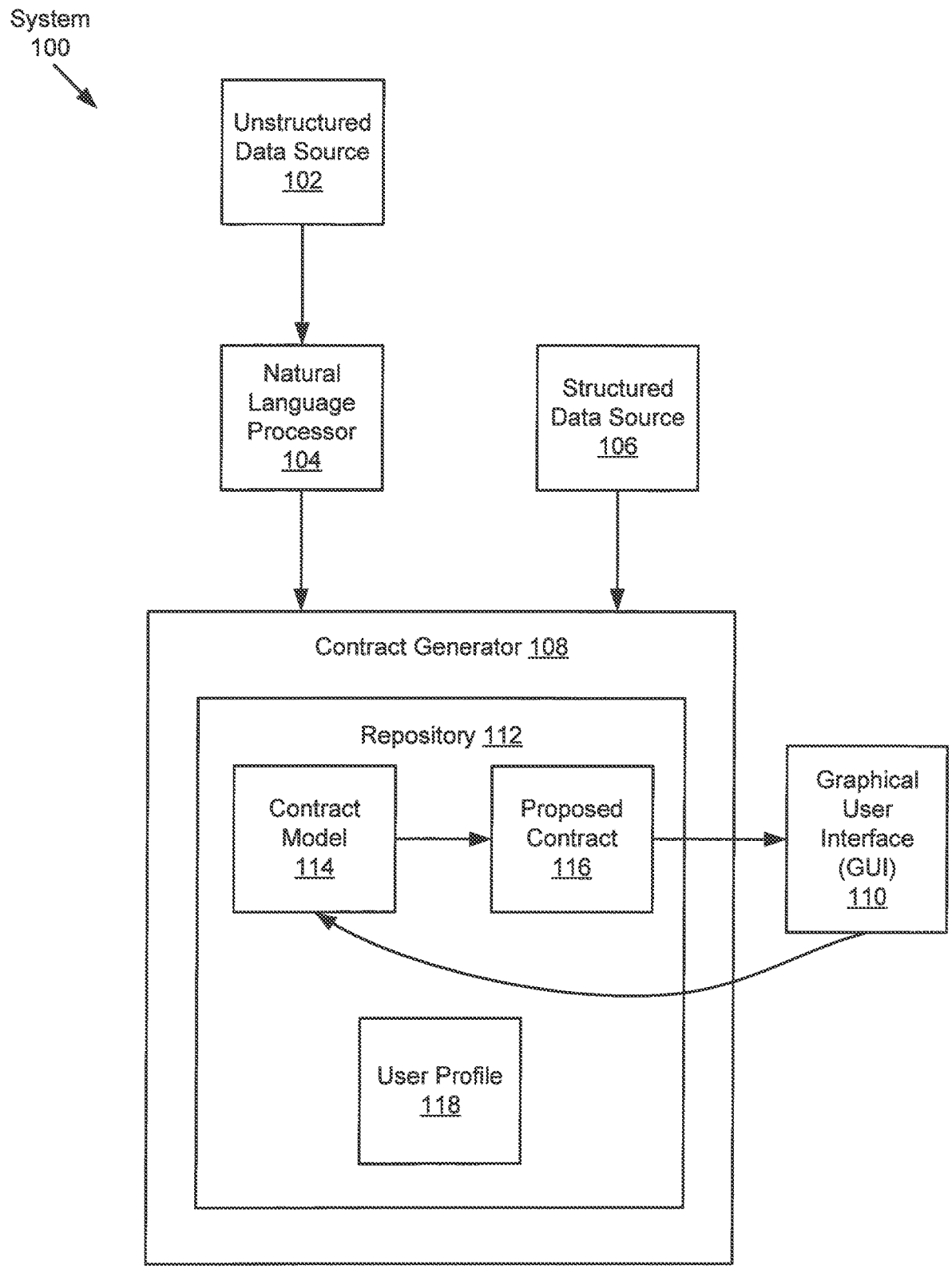
FIG. 1A and FIG. 1B shows systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention are directed to a system, method, and non-transitory computer readable medium for predicting contract details. Examples of contracts may include invoices, rental agreements, statements of work, etc. In one or more embodiments, a contract model that includes elements and attributes is obtained based on entities extracted from an unstructured data source (e.g., an email system). The entities may be extracted via natural language processing techniques. In one or more embodiments, the contract model is generated using machine learning techniques. In one or more embodiments, a proposed contract (e.g., a proposed invoice) is generated by applying the contract model to the extracted entities. The proposed contract may predict specific values for the elements and attributes of the contract model.

A confidence score may be associated with each element and attribute of the contract model, and with each element value and attribute value of the proposed contract. The confidence scores may be viewed as measures of the reliability of the corresponding predictions. For example, an attribute may have an attribute score indicating the likelihood of the attribute being included in a proposed contract.

In one or more embodiments, the confidence scores may be adjusted based on correlating element values and attribute values with data obtained from a structured data source (e.g., a financial management application, a data warehouse, etc.). In one or more embodiments, the confidence scores may be adjusted based on correlating element values and attribute values with additional data extracted from the unstructured data source (e.g., a prior email thread). Over time, a contract generator may learn patterns in unstructured data that correlate with the formation of contracts.

In one or more embodiments, the proposed contract is displayed via a graphical user interface (GUI) so that a user may edit the proposed contract and generate a final contract. In addition, user feedback obtained from the GUI that may be used to adjust (e.g., retrain) the contract model. The scope of the user feedback may be limited to the proposed contract being displayed, or may be limited to a specific type of contract model.

FIG. 1A shows a system (100) in accordance with one or more embodiments of the invention. As shown in FIG. 1A, the system (100) includes an unstructured data source (102), a natural language processor (104), a structured data source (106), a contract generator (108), and a graphical user interface (GUI) (110). In one or more embodiments, the unstructured data source (102), the natural language processor (104), the structured data source (106), the contract generator (108), and GUI (110), may be all or part of a computing system, such as, for example, the computing system (500) discussed below in the description of FIG. 5A, or may be all or part of a client device, such as, for example, the client device (526) discussed below in the description of FIG. 5B. In one or more embodiments of the invention, the unstructured data source (102), natural language processor (104), structured data source (106), contract generator (108), and GUI (10) may communicate via a computer network (not shown) (e.g., the network (520) described with respect to FIG. 5B).

In one or more embodiments, the unstructured data source (102) is any data source that includes unstructured data. In one or more embodiments, each portion of the unstructured data source may include a timestamp. In one or more embodiments, the timestamp may be a date (e.g., indicating when the portion of the unstructured data source was generated). In one or more embodiments, the timestamp may include a time of day.

In one or more embodiments, the unstructured data is text represented in natural language. In one or more embodiments, the unstructured data source (102) includes messages exchanged between individuals, businesses, and/or automated agents. In one or more embodiments, the messages may grouped into threads (e.g., conversations). Examples of unstructured data sources (102) include: email systems, texting systems (e.g., systems based on Short Message Service (SMS), Multimedia Messaging Service (MMS), etc.), messaging applications (e.g., WhatsApp, Facebook Messenger), etc. In one or more embodiments, the system includes multiple unstructured data sources (102).

In one or more embodiments, the natural language processor (104) includes functionality to extract entities from the unstructured data source (102). Examples of entities may include: names, unique identifiers, organizations, product names, locations, dates and/or times, quantities, and/or any other meaningful unit of data included in the unstructured data source (102). A variety of techniques may be used to implement the natural language processor (104), including: rule-based techniques, statistics-based techniques, classification techniques (e.g., Naïve Bayes classification), logistic regression, etc.

In one or more embodiments, the structured data source (106) may be any data source including structured data that represents relationships among various entities. In one or more embodiments, each portion of the structured data source may include a timestamp. A database record is one example of structured data, where the database record represents relationships among various entities (e.g., field values), Examples of structured data sources (106) include systems (e.g., database systems) for storing structured data about the financial transactions of a user, such as Mint® and Intuit® QuickBooks Online® (Mint, Intuit, and QuickBooks Online are trademarks of Intuit, Inc., Mountain View, Calif.), etc. Other examples of structured data sources (106) include systems for storing structured data about the activities of a user, such as inventory systems, contract databases, etc. In one or more embodiments, the system includes multiple structured data sources (106). Additional examples of structured data sources (106) include third-party systems that include publicly available information, such as credit reports, tenant history reports, etc.

In one or more embodiments, the contract generator (108) includes a repository (112). In one or more embodiments, the repository (112) may be any type of storage unit and/or device (e.g., a file system, database, collection of tables, or any other storage mechanism) for storing data. Further, the repository (112) may include multiple different storage units and/or devices. The multiple different storage units and/or devices may or may not be of the same type or located at the same physical site.

In one or more embodiments, the repository (112) includes a contract model (114), a proposed contract (116), and a user profile (118). In one or more embodiments, a contract model (114) describes the structure of a contract. In contrast, in one or more embodiments, a proposed contract (116) describes the contents of a contract.

In one or more embodiments, the contract generator (108) includes functionality to generate and/or modify a contract model (114) using entities extracted (e.g., by the natural language processor (1104)) from the unstructured data source (102) and/or a training dataset. In one or more embodiments, the contract generator (108) uses machine learning techniques (e.g., using the MLlib machine learning library from Apache Spark™ or systems with similar functionality) to generate a contract model (114), in one or more embodiments, unstructured data source (102) functions as a training dataset for the contract generator (108).

In one or more embodiments, the natural language processor (1104) and contract generator (108) may be implemented using Python libraries and toolkits, such as, for example, Numpy, SciPy, Pandas, and/or Scikit-learn.

In one or more embodiments, the contract generator (1108) includes functionality to generate and/or modify a proposed contract (116) using entities extracted from the unstructured data source (102), in the context of a contract model (114). In one or more embodiments, the contract generator (108) may use the structured data source (106) to modify and/or validate the proposed contract (116).

For example, the unstructured data source (102) may be an email system from which the natural language processor (104) has extracted entities that the contract generator (108) determines may relate to a contract between two parties in an email conversation. In this non-limiting example, the structured data source (106) may be a contract database. The contract generator (108) may attempt to correlate the email conversation with structured data obtained from the contract database, to determine whether an actual contract was formed based on the email conversation. The presence or absence of such a correlation may be used by the contract generator (108) to generate a proposed contract (116) using the entities extracted from the email conversation.

Figure 1B:
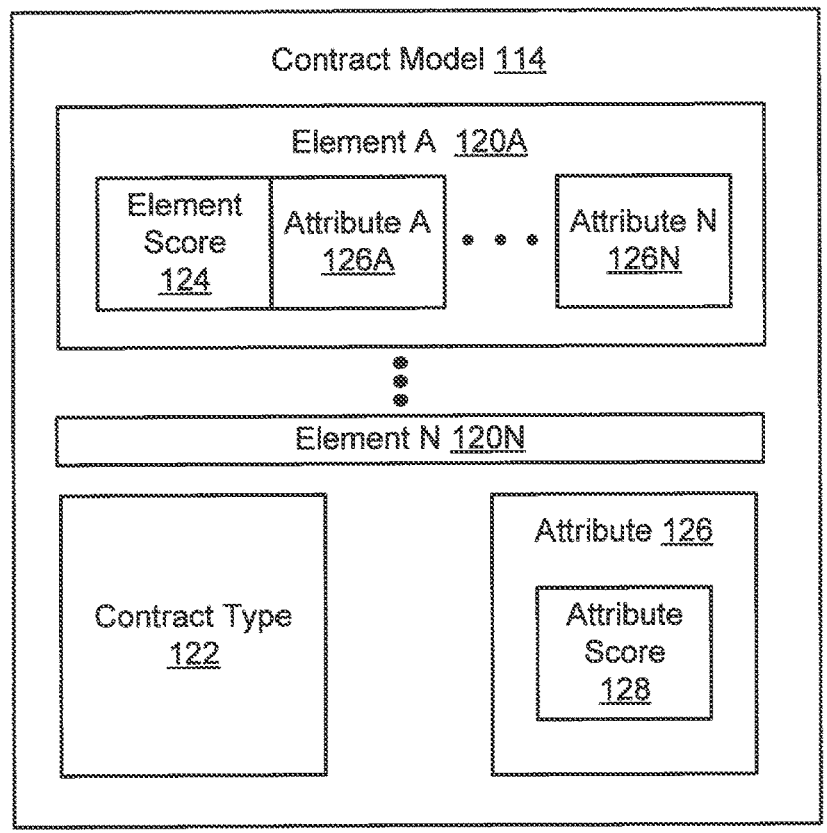
Figure 1B:
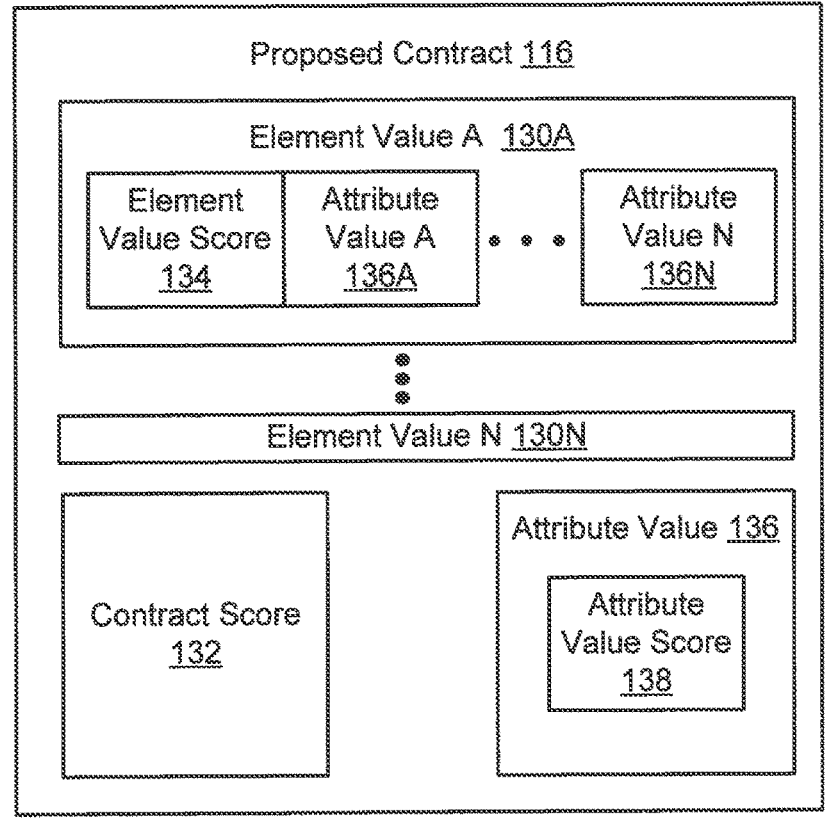

Turning to FIG. 1B, in one or more embodiments, a contract model (114) includes elements (120A-120N) and a contract type (122). An element (120A 120N) may include an element score (124) and attributes (126A-126N), In one or more embodiments, the element score (124) indicates the likelihood of the corresponding element (120A-120N) being included in a proposed contract (116) generated from the contract model (114). In one or more embodiments, the element score (124) indicates the likelihood of the corresponding element (120A-120N) being included in a proposed contract (116) generated manually (e.g., by hand) by the user. In one or more embodiments, the element score (124) is a probability whose value is between 0 and 1. An element score (124) of 1 may indicate that an element (120A-120N) is required to be in a proposed contract (116) generated from the corresponding contract model (114). For example, a proposed invoice may be required to include a line item element (120A-120N) (e.g., where an invoice model is a type of contract model (114)). Alternatively, an element score (124) of 0.4 may indicate that there is a 0.4 probability that the corresponding element (120A-120N) is in a proposed contract (116) generated from the corresponding contract model (114). For example, there may be a 0.4 probability of a tax identification number element (120A-120N) being included in a proposed invoice. In one or more embodiments, an element (120A-120N) includes sub-elements (120A-120N) that provide additional detail about the element (120A-120N).

In one or more embodiments, an attribute (126A-126N) adds further detail that describes an element (120A-120N). Continuing the example above, a line item element (120A-120N) may have attributes (126A-126N) for quantity, price, color, size, etc. An attribute (126) may include an attribute score (128). In one or more embodiments, the attribute score (128) indicates the likelihood of the corresponding attribute (126A-126N) being associated with an element (120A-120N) of a proposed contract (116) generated from the contract model (114). In one or more embodiments, the attribute score (128) indicates the likelihood of the corresponding attribute (126A-126N) being associated with an element (120A-120N) of a proposed contract (116) generated manually by the user. For example, an attribute score (128) of may indicate that there is a 0.2 probability that the corresponding attribute (126) is associated with an element (120A-120N) of a proposed contract (116) generated from the contract model (114). For example, an attribute score (128) of 0.2 associated with a color attribute (126A-126N) of a line item element (120A-120N) may indicate that there is a 0.2 probability of a color attribute (126A-126N) being associated with a line item element (120A-120N) of a proposed invoice.

Continuing with FIG. 1B, in one or more embodiments, a proposed contract (116) includes element values (130A-130N) and a contract score (132). In one or more embodiments, a proposed contract (116) provides values to the elements (120A-120N) and attributes (126A-126N) of the contract model (114) from which the proposed contract (116) is generated. In one or more embodiments, an element value (130A-130N) may be an entity extracted by the natural language processor (104) from the unstructured data source (102).

An element value (130A-130N) may include an element value score (134) and attribute values (136A-136N). In one or more embodiments, the element value score (134) indicates the likelihood of the corresponding element value (130A-130N) being included in a proposed contract (116). In one or more embodiments, the element value score (134) is a probability whose value is between 0 and 1. An element value score (134) of 0.6 may indicate a probability of 0.6 that the corresponding element value (130A-130N) is in a specific proposed contract (116). For example, the contract generator (108) may determine that there is a 0.6 probability that the element value (130A-130N) corresponding to a specific line item is included in a proposed invoice. The proposed invoice may be generated from an invoice model, which is a contract model (114) with contract type "invoice" (122).

In one or more embodiments, an attribute value (136A-136N) adds further detail that describes an element value (130A-130N), In one or more embodiments, an attribute value (136A-136N) may be an entity extracted by the natural language processor (104) from the unstructured data source (102). Continuing the non-limiting example above, the element value (130A-130N) corresponding to a specific line item may have attribute values (136A-136N) for item identifier, quantity, price, color, size, etc. An attribute value (136) may include an attribute value score (138). In one or more embodiments, the attribute value score (138) indicates the likelihood of the corresponding attribute value (136) being associated with an element value (130A-130N) of a proposed contract (116). For example, an attribute value score (138) of 0.1 may indicate that there is a 0.1 probability that the corresponding attribute value (136A-136N) is associated with a specific element value (130A-130N) in the proposed contract (116). Continuing the non-limiting example above, an attribute value score (138) of 0.1 associated with the color attribute value "turquoise" (136A-136N) may indicate that there is a 0.1 probability of a color attribute value "turquoise" (136A-136N) being associated with a specific element value (130A-130N) (e.g., a specific line item) in the corresponding proposed invoice.

In one or more embodiments, the proposed contract (116) represents a prediction regarding the formation of a contract based on information (e.g., entities) extracted from the unstructured data source (102) by the natural language processor (104). In one or more embodiments, the prediction includes structure and contents of that contract. For example, the unstructured data source (102) may include email messages exchanged between parties seeking to form a contract, such as a consumer and a small business owner negotiating a sales transaction.

In one or more embodiments, the contract score (132) may indicate the likelihood of the corresponding proposed contract (116) representing an actual contract formed between parties. Element value scores (134) and attribute value scores (138) may represent the likelihood that a specific entity (e.g., an entity used as an element value (130) or an attribute value (136) in the proposed contract (116)) plays a specific role in the actual contract.

In one or more embodiments, the contract generator (108) calculates the various scores used in contract models (14) and proposed contracts (116) (e.g., element scores (124), attribute scores (128), contract scores (132), element value scores (134) and/or an attribute value scores (138)) using one or more of the aforementioned machine learning techniques.

Continuing with FIG. 1B, in one or more embodiments, the contract model (114) may be specific to a contract type (122), For example, there may be a contract model (114) corresponding to various contract types (122), including: invoices, rental agreements, statements of work, and/or any other type of contract or agreement. In one or more embodiments, the contract type (122) is optional. In one or more embodiments, the various types of contract models (114) may be organized into a hierarchy. For example, a contract model (114) with contract type "wholesale invoice" (122) may inherit the structure (e.g., elements (120A-120N)) of a contract model (114) with contract type "invoice" (122).

Returning to FIG. 1A, in one or more embodiments, a user profile (118) includes settings that adjust the behavior of the contract generator (108) based on user preferences. In one or more embodiments, the user profile (118) may include a contract score threshold for a contract score (132) that indicates when a proposed contract (116) may be displayed to the user via the GUI (110). In other words, the contract score threshold may indicate when a contract score (132) is sufficiently high to justify presenting the corresponding proposed contract (116) to the user. In one or more embodiments, a proposed contract (116) may be displayed to the user via the GUI (110) regardless of the corresponding contract score (132). In one or more embodiments, a predetermined global contract score threshold for a contract score (132) indicates when a proposed contract (116) may be displayed to the user via the GUI (110).

In one or more embodiments, the user profile (118) may include an element value score threshold for an element value score (134) that indicates when an element value (130A-130N) may be displayed to the user via the GUI (110). In other words, the element value score threshold may indicate when an element value score (134) is sufficiently high to justify presenting the corresponding element value (130A-130N) to the user. In one or more embodiments, an element value (130A-130N) may be displayed to the user via the GUI (110) regardless of the corresponding element value score (134). In one or more embodiments, a predetermined global element value score threshold for an element value score (134) indicates when an element value (130A-130N) may be displayed to the user via the GUI (110). In one or more embodiments, the user profile (118) may include an attribute value score threshold for an attribute value score (138) that indicates when an attribute value (136A-136N) may be displayed to the user via the GUI (110). In other words, the attribute value score threshold may indicate when an attribute value score (138) is sufficiently high to justify presenting the corresponding attribute value (136A-136N) to the user. In one or more embodiments, an attribute value (136A-136N) may be displayed to the user via the GUI (110) regardless of the corresponding attribute value score (138). In one or more embodiments, a predetermined global attribute value score threshold for an attribute value score (138) indicates when an attribute value (136A-136N) may be displayed to the user via the GUI (110).

In one or more embodiments, the user profile (118) may include a weighting factor that ranks the relevance of structured data obtained from the structured data source (106) relative to information extracted from the unstructured data source (102). In this non-limiting example, the weighting factor may be used when calculating (e.g., using various machine learning techniques) a contract score (132), an element score (124), an attribute score (128), an element value score (134) and/or an attribute value score (138) of a proposed contract (116).

In one or more embodiments, GUI (110) is operatively connected to the contract generator (108). In one or more embodiments, the GUI (110) enables a user to view and/or modify a proposed contract (116). The GUI (110) may include functionality to receive input from a user and present information to the user via a computing device, generally through graphical, text, audio, and/or any other input/output representations. In one or more embodiments, the GUI (110) includes functionality to provide user feedback to the contract generator (108). For example, the user feedback may include accepting, rejecting and/or modifying a proposed contract (116). In one or more embodiments, in response to receiving the user feedback, the contract generator (108) updates the contract model (114). In other words, the contract generator (108) may use the user feedback to improve (e.g., retrain) the contract model (114). For example, the user feedback may add an element (120A-120N) to the proposed contract (116), in which case the contract generator (108) may add the element (120A-120N) to the contract model (114). Alternatively, the user feedback may remove an element (120A-120N) from the proposed contract (116), in which case the contract generator (108) may reduce the element score (124) of the element (120A-120N) in the contract model (114). In one or more embodiments, the user feedback is upsampled increase a bias for the user feedback within the contract model (114).

In one or more embodiments, the GUI (110) includes settings that adjust the behavior of the contract generator (108) based on user preferences. In one or more embodiments, the GUI (110) may include a slider that enables the user to set the aforementioned contract score threshold. In one or more embodiments, the GUI (110) may include a slider that enables the user to set the aforementioned element value score threshold. In one or more embodiments, the GUI (110) may include a slider that enables the user to set the aforementioned weighting factor.

In one or more embodiments, the GUI (110) may prompt the user to indicate the scope of the user feedback. For example, the scope of the user feedback may be limited to the proposed contract (116) being displayed to the user via the GUI (110). Alternatively, the scope of the user feedback may be limited to a specific type of contract model (114) (e.g., as indicated by a contract type (122)). Still alternatively, the scope of the user feedback may be globally applicable to all types of contract models (114).

While FIG. 1A and FIG. 1B show configurations of components, other configurations may be used without departing from the scope of the invention. For example, various components may be combined to create a single component. As another example, the functionality performed by a single component may be performed by two or more components.

Figure 2:
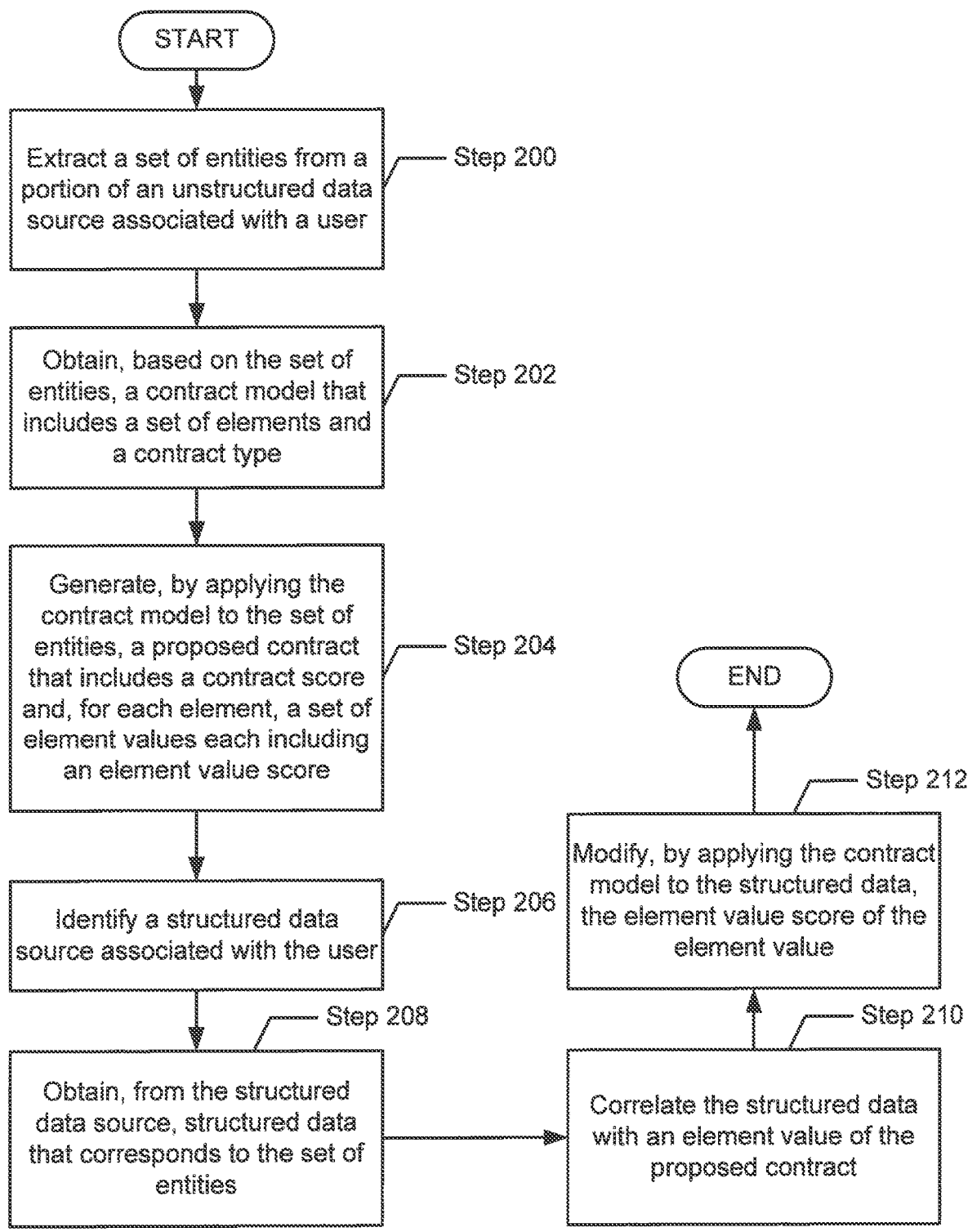
FIG. 2 and FIG. 3 show flowcharts in accordance with one or more embodiments of the invention.

FIG. 2 shows a flowchart in accordance with one or more embodiments of the invention. The flowchart depicts a process for predicting contract details. One or more of the steps in FIG. 2 may be performed by the components (e.g., the contract generator (108) and/or the natural language processor (104)) of the system (100), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a first set of entities is extracted from a portion of an unstructured data source associated with a user. In one or more embodiments, the unstructured data source includes messages represented in natural language exchanged between individuals, businesses, and/or automated agents. The messages may grouped into threads. Examples of unstructured data sources include: email systems, texting systems, messaging applications, etc. In one or more embodiments, first set of entities is extracted by the natural language processor using a variety of natural language processing techniques. An entity may be any meaningful unit of data included in the unstructured data source. The user may be a small business owner. The user may be any individual seeking to enter into a contract with another party (e.g., a business entity or another individual).

In Step 202, a contract model is obtained, based on the first set of entities, that includes a set of elements and a contract type. In one or more embodiments, the contract model is obtained by the contract generator.

An element may include an element score and attributes. In one or more embodiments, the element score indicates the likelihood of the corresponding element being included in a proposed contract generated from the contract model. In one or more embodiments, the element score indicates the likelihood of the corresponding element being included in a proposed contract generated manually (e.g., by hand) by the user. In one or more embodiments, an attribute adds further detail that describes an element. For example, a line item element may have attributes for quantity, price, color, size, etc. An attribute may include an attribute score that indicates the likelihood of the corresponding attribute being associated with an element of a proposed contract generated from the contract model. In one or more embodiments, the attribute score indicates the likelihood of the corresponding attribute being associated with an element of a proposed contract generated manually by the user.

In one or more embodiments, there is a contract model corresponding to various contract types, including: invoices, rental agreements, statements of work, and/or any other type of contract or agreement. In one or more embodiments, the contract type is received from the user. In one or more embodiments, the contract type is determined (e.g., by the contract generator) based on the first set of entities. For example, if an entity of the first set of entities is "purchase", "order", or "invoice", then the contract type may be determined to be "invoice".

In one or more embodiments, the contract generator may originally generate the contract model using other entities extracted from the unstructured data source (e.g., the unstructured data source may function as a training dataset for the contract generator).

In one or more embodiments, multiple contract types may be under consideration (e.g., by the contract generator) due to the presence of specific entities in the first set of entities that may be indicative of a specific type of contract. For example, multiple contract types may be assigned a contract type score that represents an estimate of the likelihood that the corresponding proposed contract represents a contract corresponding to a specific contract type.

In Step 204, a proposed contract is generated that includes a contract score and, for each element of the set of elements, a set of element values. The proposed contract may be generated (e.g., by the contract generator) by applying the contract model to the first set of entities. The proposed contract may predict specific values for the elements and attributes of the contract model, based on the first set of entities. For example, the unstructured data source may include email messages exchanged between a consumer and a small business owner regarding a sales transaction.

An element value may include an element value score and attribute values. In one or more embodiments, the element value score indicates the likelihood of the corresponding element value being included in the proposed contract. For example, the contract generator may determine that there is a 0.6 probability that the element value corresponding to a specific line item is included in a proposed invoice.

In one or more embodiments, an attribute value adds further detail that describes an element value. Continuing the non-limiting example above, the element value corresponding to a specific line item may have attribute values for quantity, price, color, size, etc. An attribute value may include an attribute value score. In one or more embodiments, the attribute value score indicates the likelihood of the corresponding attribute value being associated with a specific element value of a proposed contract. Continuing the non-limiting example above, an attribute value score of 0.1 associated with a specific color attribute value may indicate that there is a 0.1 probability of the specific color attribute value being associated with the element value corresponding to a specific line item.

In one or more embodiments, the contract score indicates the likelihood of the corresponding proposed contract being a valid proposed contract (e.g., whether the corresponding proposed contract represents an actual contract formed between parties).

In Step 206, a structured data source associated with the user is identified. In one or more embodiments, the structured data source is identified (e.g., by the contract generator) based on the contract type of the contract model obtained in Step 202 above. For example, it the contract type is "invoice", then the structured data source may be a financial management application of the user that includes financial transactions of the user. As another example, it the contract type is "rental agreement", then the structured data source may be a tenant history database that lists the rental history of various tenants.

In Step 208, structured data that corresponds to the first set of entities is obtained from the structured data source. In one or more embodiments, the structured data source may be queried (e.g., by the contract generator) using the first set of entities. For example, querying an invoice database (e.g., the structured data source) with entities "Mike Jones" and "sweater" may yield prior invoices (e.g., structured data) that include a line item "sweater" for the customer "Mike Jones". As another example, querying an invoice database (e.g., the structured data source) with entities "Mike Jones" and "sweater" and "red" may yield prior invoices (e.g., structured data) that include a line item "sweater" with color "red" for the customer "Mike Jones". In one or more embodiments, no structured data corresponding to the first set of entities is found in the structured data source.

In Step 210, the structured data is correlated with an element value of the proposed contract. Continuing the non-limiting example above, the invoices corresponding to the entities "Mike Jones" and "sweater" may be correlated with an element value "sweater".

In one or more embodiments, the structured data may be further correlated with additional attribute values corresponding to the element value. For example, the line item (e.g., element value) may also be associated with an attribute value "red" corresponding to an attribute "color".

In Step 212, the element value score of the element value is modified, by applying the contract model to the structured data. That is, the structured data obtained in Step 208 above is used to modify the element value score corresponding to the element value, in order to improve the accuracy of the proposed contract. That is, the modified element value score may be considered more accurate since it is based on correlating the element value with the structured data. Continuing the non-limiting example above, if the structured data obtained in Step 208 above includes several recent invoices corresponding to the entities "Mike Jones" and "sweater", then the element value score corresponding to the element value "sweater" may be modified to reflect an increased likelihood that the invoice (e.g., proposed contract) will include a line item "sweater". In contrast, if no structured data was found in Step 208 above, then the element value score corresponding to the element value "sweater" may be modified to reflect a reduced likelihood that the invoice will include a line item "sweater". Furthermore, if the structured data obtained in Step 208 above includes invoices corresponding to the entities "Mike Jones", "sweater", and "red", then the attribute value score corresponding to the attribute value "red" for the line item "sweater" may be modified to adjust the likelihood that the invoice will include a line item "sweater" with color "red".

In one or more embodiments, the element value score is modified using a weighting factor that ranks the relevance of structured data obtained from the structured data source relative to information extracted from the unstructured data source. In one or more embodiments, the weighting factor may be adjusted to more heavily weight structured data that represents more recent activities (e.g., as indicated by a value of a date field in the structured data). In one or more embodiments, the weighting factor may be obtained from a user profile associated with the user. In one or more embodiments, the weighting factor may be obtained from a slider of the graphical user interface (GUI) whose position may be set by the user.

In one or more embodiments, the contract score of the proposed contract may be modified, by applying the contract model to the structured data. Continuing the non-limiting example above, if the structured data obtained in Step 208 includes several recent invoices corresponding to the entities "Mike Jones" and "sweater", then the contract score of the proposed contract may be modified to reflect an increased likelihood that an invoice (e.g., proposed contract) will actually be issued.

Figure 3:
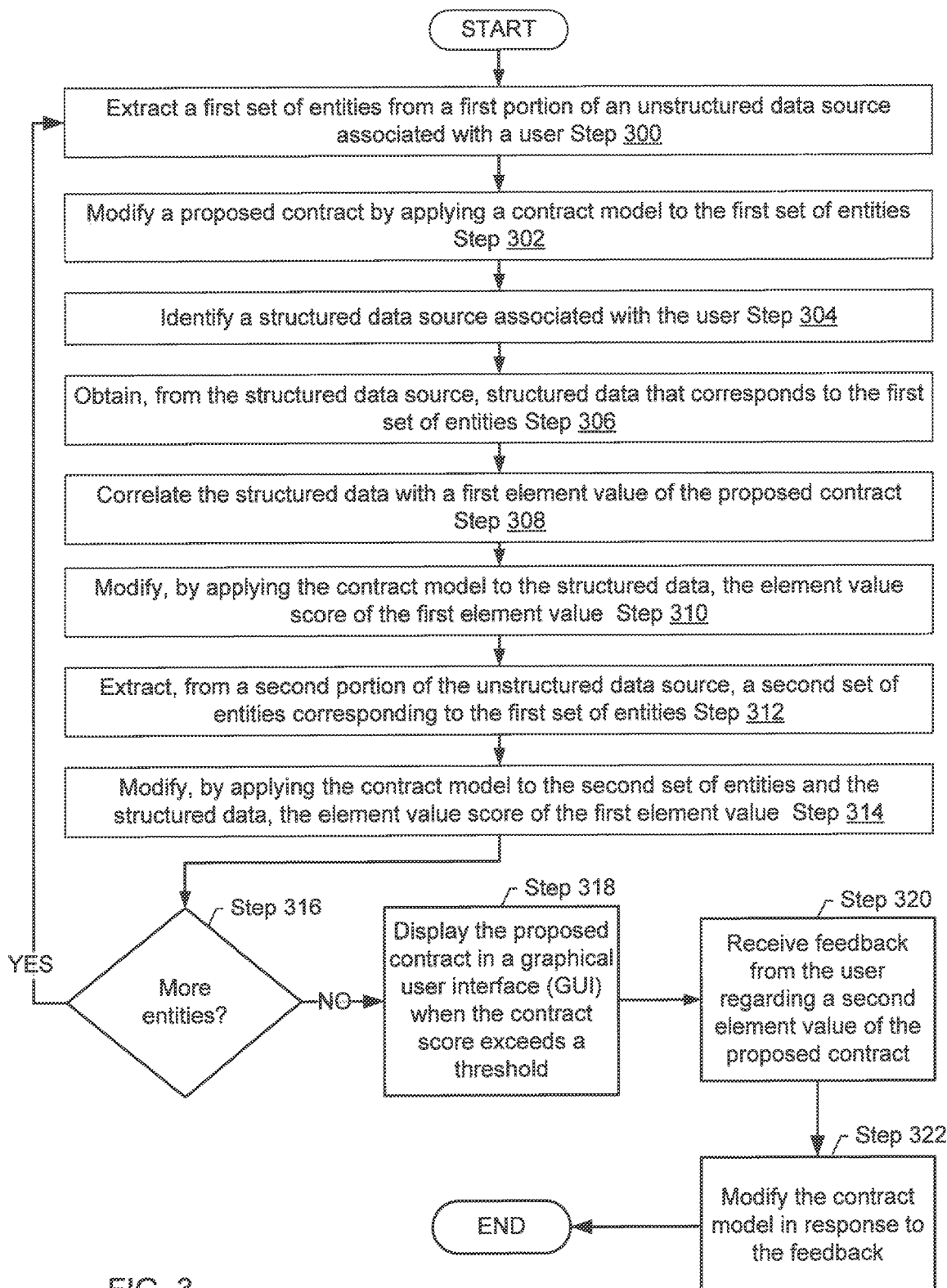

FIG. 3 shows a flowchart in accordance with one or more embodiments of the invention. The flowchart depicts a process for predicting contract details, One or more of the steps in FIG. 3 may be performed by the components (e.g., the contract generator (108), the natural language processor (104) and/or the GUI (110)) of the system (100), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, a first set of entities is extracted from a first portion of an unstructured data source associated with a user (see description of Step 200 above).

In Step 302, a proposed contract is modified by applying a contract model to the first set of entities (see descriptions of Step 204 and Step 212 above). In one or more embodiments, the contract model is obtained based on the first set of entities (see description of Step 202 above).

In Step 304, a structured data source associated with the user is identified (see description of Step 206 above).

In Step 306, structured data that corresponds to the first set of entities is obtained from the structured data source (see description of Step 208 above).

In Step 308, the structured data is correlated with a first element value of the proposed contract (see description of Step 210 above).

In Step 310, the element value score of the first element value is modified, by applying the contract model to the structured data (see description of Step 212 above).

In Step 312, a second set of entities corresponding to the first set of entities is extracted from a second portion of the unstructured data source (see description of Step 300 above). In one or more embodiments, the second portion of the unstructured data source corresponds to historical unstructured data having a second timestamp earlier than a first timestamp associated with the first portion of the unstructured data source (see Step 300 above).

For example, the first portion of the unstructured data source may correspond to a recent thread stored in an email system, and the second portion of the unstructured data source may correspond to an earlier thread stored in the email system. In one or more embodiments, correlating the second set of entities (extracted from historical unstructured data) with structured data obtained in Step 306 having a third timestamp comparable to the second timestamp provides a historical context for adjusting the various scores (e.g., contract score, element value scores and/or attribute value scores) of the proposed contract. For example, the second timestamp may be considered comparable to the third timestamp when the two timestamps are within a few days of each other.

In one or more embodiments, a third set of entities corresponding to the first set of entities may be extracted from a third portion of the unstructured data source, and so on. For example, the first set of entities may relate to a recurring activity, such that there are multiple sets of entities corresponding to the first set of entities in the unstructured data source corresponds to historical unstructured data.

In one or more embodiments, the second set of entities may be extracted from a different unstructured data source associated with the user than the unstructured data source of Step 300 above. For example, the second set of entities may be extracted from an email thread in an alternate email system or texting (e.g., SMS) system used by the user. For example, an email address for the alternate email system may be obtained from a profile of the user. Alternatively, an email address for the alternate email system may be obtained from the structured data obtained in Step 306 above (e.g., from a field within the structured data).

In Step 314, the element value score of the first element value is modified, by applying the contract model to the second set of entities and the structured data. In one or more embodiments, the second set of entities may be compared to the structured data obtained in Step 306 above to determine whether a prior contract was formed (e.g., whether an invoice was previously issued) based on the second set of entities at a point in time comparable to the second timestamp. For example, such a determination may be used to adjust the contract score of the proposed contract (e.g., the contract score may be increased in light of the determination, since it may be more likely that the proposed contract will result in the formation of an actual contract).

In one or more embodiments, the contents of the prior contract may be analyzed to determine whether the first element value was present in the prior contract. Then, based on applying the contract model to the second set of entities and the structured data, an adjustment may be made to the element value score of the first element value. For example, the presence of the line item (e.g., element value) "sweater" in the prior contract (e.g., invoice) may result in increasing the element value score of the corresponding element value.

Similarly, in one or more embodiments, the contents of the prior contract may be analyzed to determine whether other element values and/or attribute values of the proposed contract were present in the prior contract. Then, based on applying the contract model to the second set of entities and the structured data, adjustments may be made to the corresponding element value scores and/or attribute value scores of the proposed contract.

In one or more embodiments, an element score and/or an attribute score of the contract model may be modified based on analyzing the structure and/or contents of the prior contract, That is, the prior contract may be used as training data for adjusting the contract model. For example, the presence of a discount attribute in the terms of the prior contract may be the basis for increasing the attribute score of the attribute "discount" of the element "terms" of the contract model (e.g., where the contract type of the contract model is "invoice").

If, in Step 316, it is determined that there are additional entities remaining to be processed in the unstructured data source, then Step 300 is repeated, and the loop including Step 300, Step 302, Step 304, Step 306, Step 308, Step 310, Step 312, and Step 314 is repeated.

Otherwise, if Step 316 determines that there are no additional entities remaining to be processed in the unstructured data source, then Step 318 below is performed.

In Step 318, the proposed contract is displayed in a graphical user interface (GUI) when the contract score of the proposed contract exceeds a contract score threshold, That is, the contract score threshold may indicate when a contract score is sufficiently high to justify presenting the corresponding proposed contract to the user. In one or more embodiments, the GUI includes a slider corresponding to the contract score threshold, where the position of the slider may be set by the user. Alternatively, the contract score threshold may be obtained from a user profile associated with the user.

In one or more embodiments, the GUI enables a user to modify a proposed contract. In one or more embodiments, each element value of the proposed contract is displayed in the GUI when the element value score of the element value exceeds an element value score threshold, That is, the element value score threshold may indicate when an element value score is sufficiently high to justify presenting the corresponding element value to the user. In one or more embodiments, when the element value score of an element value is below the element value score threshold, then multiple alternative (e.g., mutually exclusive) element values may be displayed to the user via the GUI. For example, the multiple alternative element values may be displayed in a menu.

In one or more embodiments, each attribute value of the proposed contract is displayed in the GUI when the attribute value score of the attribute value exceeds an attribute value score threshold, That is, the attribute value score threshold may indicate when an attribute value score is sufficiently high to justify presenting the corresponding attribute value to the user. In one or more embodiments, when the attribute value score of an attribute value is below the attribute value score threshold, then multiple alternative (e.g., mutually exclusive) attribute values may be displayed to the user via the GUI.

In Step 320, feedback is received from the user regarding a second element value of the proposed contract. In one or more embodiments, the GUI includes functionality to provide the feedback to the contract generator. In one or more embodiments, the user feedback may include accepting, rejecting and/or modifying a proposed contract. In one or more embodiments, when the user accepts a proposed contract, a corresponding entry is stored in a structured data source (e.g., a contracts database, an invoice database, etc.), depending on the contract type of the associated contract model. In one or more embodiments, modifying the proposed contract includes modifying an element value of the proposed contract. In one or more embodiments, modifying the proposed contract includes modifying an attribute value of the proposed contract.

In Step 322, the contract model is modified in response to the feedback. In one or more embodiments, the contract generator receives the feedback from the GUI. In one or more embodiments, the feedback modifies the structure of the proposed contract, in which case the modified structure may be used to improve (e.g., retrain) the contract model. For example, the feedback may add an element to the proposed contract, in which case the contract generator may add the element to the contract model. Similarly, the feedback may add an attribute to the proposed contract, in which case the contract generator may add the attribute to the contract model. Alternatively, the feedback may remove an element from the proposed contract, in which case the contract generator may reduce the element score of the element in the contract model. Similarly, the feedback may remove an attribute from the proposed contract, in which case the contract generator may reduce the attribute score of the attribute in the contract model. For example, if a user removes an attribute "discount" from an element "terms" of an invoice model (e.g., a type of contract model), then the attribute score for the attribute "discount" may be reduced in the invoice model. That is, as a result of the feedback, the invoice model may be retrained to reduce the likelihood of including a "discount" attribute.

In one or more embodiments, the GUI may prompt the user to indicate the scope of the feedback (e.g., by setting a flag in the GUI). For example, the scope of the user feedback may be limited to the proposed contract. Alternatively, the scope of the feedback may be limited to a specific type of contract model (e.g., as indicated by a contract type of the proposed contract). Still alternatively, the scope of the user feedback may be globally applicable to all types of contract models.

The following example is for explanatory purposes only and not intended to limit the scope of the invention. FIG. 4A, FIG. 4B, FIG. 4C, FIG. 4D, FIG. 4E, FIG. 4F, and FIG. 4G show an implementation example in accordance with one or more embodiments of the invention.

Initially, the natural language processor (104) extracts a first set of entities (404) from a first email thread (402) of an email system (400) (e.g., unstructured data source (102) of FIG. 1A) associated with a user, in this case a small business owner, as illustrated in FIG. 4A. The email messages in the first email thread (402) are between the user and a potential customer, Mike Jones. The contract generator (108) then attempts to generate a proposed contract based on the first set of entities (404) for display to the user via graphical user interface (GUI) (110).

Figure 4B:
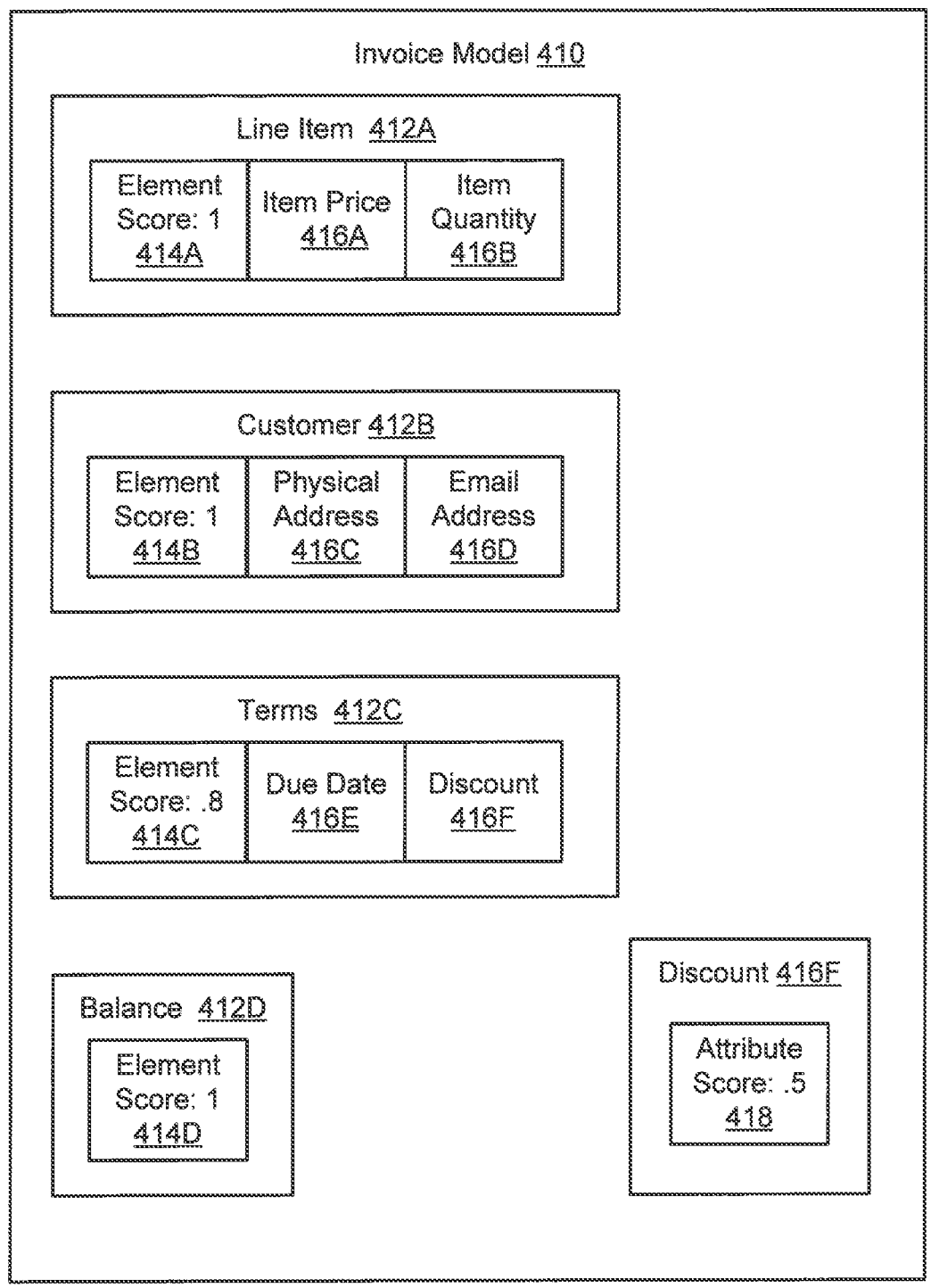

First, the contract generator (108) obtains an invoice model (410), as illustrated in FIG. 4B, based on the first set of entities (404). That is, the contract generator (108) determines, based on analyzing the first set of entities (404), that the invoice model (410) should be used instead of a general contract model. The invoice model (410) specifies an element score (414A-414D) for each element (412A-412D), indicating the likelihood that the corresponding element (412A-412D) will be present in a proposed invoice generated from the invoice model (410), The invoice model (410) also specifies attribute scores for each attribute (416A-416F) of an element (412A-412D), indicating the likelihood that the corresponding attribute (416A-416F) will be present in a proposed invoice generated from the invoice model (410). FIG. 4B illustrates an attribute score 0.5 (418) for the attribute "discount" (416F), which is an attribute of the element "terms" (412C). That is, there is a 0.5 likelihood that the terms (412C) of a proposed invoice generated from the invoice model (410) will include a discount (416F).

Next, the contract generator (108) generates a proposed invoice (430), as illustrated in FIG. 4C, by applying the invoice model (410) to the first set of entities (404). The contract generator (108) populates the element values (432A-432E) and the attribute values (436A-436H) of the proposed invoice (430) using the first set of entities (404). For example, the entity "sweater" (408) is used as an element value (432A) of the proposed invoice (430). The contract generator (108) also assigns, using the invoice model (410), element value scores (434A-434E) to each element value (432A-432E) and attribute value scores to each attribute value (436A-436H), indicating the likelihood that the corresponding element values (432A-432E) and attribute values (436A-436H) will be present in the actual proposed invoice (430) agreed to by the user and the customer. FIG. 4C illustrates an attribute value score 0.7 (440) for the attribute value "10%" (436H), corresponding to the attribute "discount" (416F) of the invoice model (410), where the attribute value "10%" (436H) is associated with the element value "terms" (432D), Therefore, there is a 0.7 likelihood that the terms (432D) of the proposed invoice (430) will include a discount of 10% The contract generator (108) also assigns, using the invoice model (410), an invoice score (438), indicating the likelihood that the proposed invoice (430) will actually be issued.

Figure 4D:
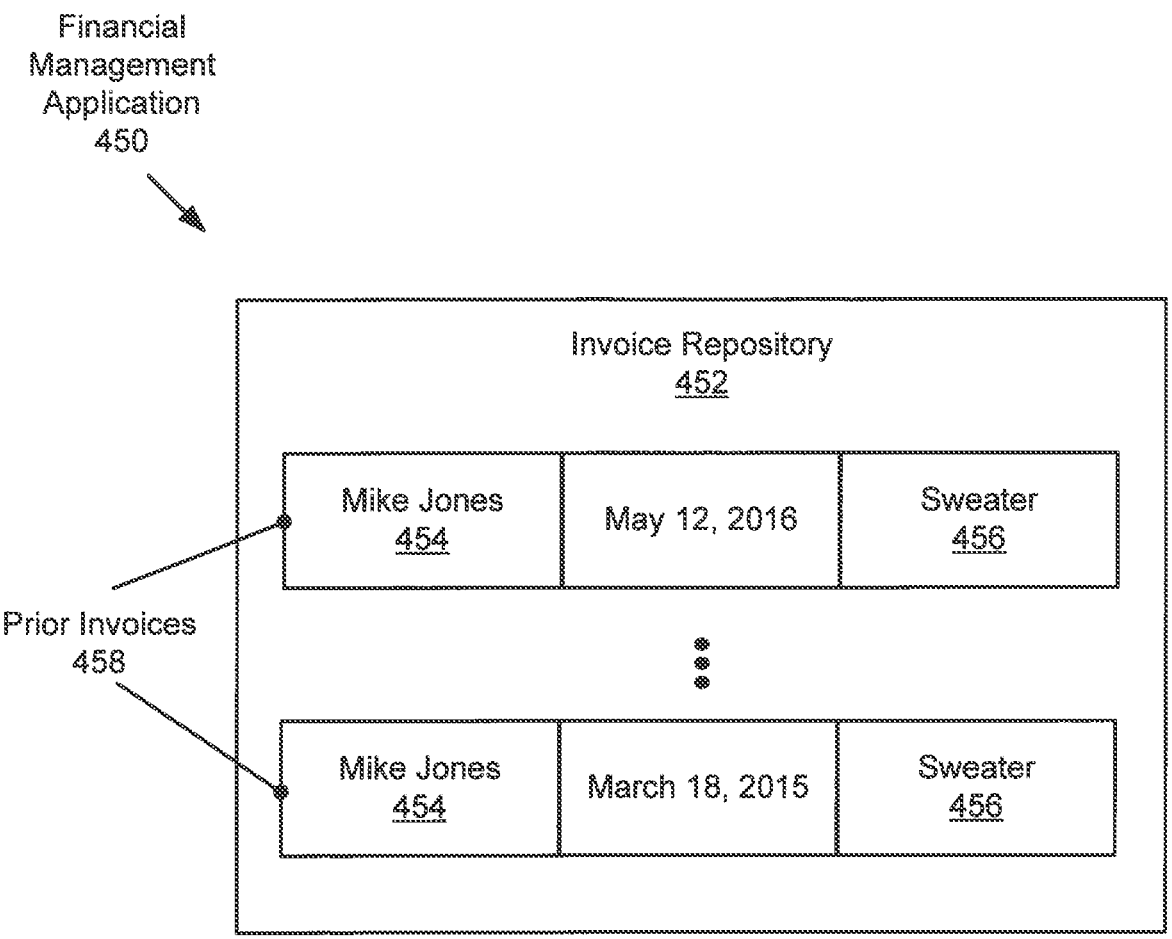

The contract generator (108) then attempts to validate and/or refine the various scores used in the proposed invoice (430). First, the contract generator (108) identifies a financial management application (450) (e.g., structured data source (106) of FIG. 1A) that includes an invoice repository (452) that includes invoices issued by, the user, as illustrated in FIG. 4D. The contract generator (108) then queries the financial management application (450) using the first set of entities (404). Specifically, the contract generator (108) queries the financial management application (450) using "Mike Jones" (406) and "sweater" (408) to obtain prior invoices (458) (e.g., structured data) that include a line item "sweater" (456) for the customer "Mike Jones" (454).

Next, the contract generator (108) correlates the prior invoices (458) with the element value "sweater" (432A) of the proposed invoice (430) shown in FIG. 4C. Then, based on correlating the element value (432A) with the prior invoices (458), the contract generator (108) increases the element value score to 0.9 (434A) for the element value (432A), as shown in FIG. 4E. That is, now that it is known that the customer Mike Jones (454) has purchased sweaters from the user in the past, the likelihood of the proposed invoice (430) including an element value "sweater" (432A) has increased.

Next, the contract generator (108) attempts to perform additional validation and/or refinement of the various scores used in the proposed invoice (430) using a prior email thread (472) of the email system (400). The contract generator (108) instructs the natural language processor (104) to find a prior email thread (472) from which a second set of entities (474) may be extracted corresponding to the first set of entities (404), as illustrated in FIG. 4F. That is, the timestamps associated with the messages in the prior email thread (472) are substantially earlier than the timestamps associated with the messages in the first email thread (402). In this case, the second set of entities (474), like the first set of entities (404), includes "Mike Jones" (406) and "sweater" (408).

Next, the contract generator (108) attempts to correlate the second set of entities (474) with additional prior invoices (e.g., structured data) included in the financial management application (450), where the additional prior invoices have timestamps comparable to the timestamps of the messages in the prior email thread (472). The contract generator (108) seeks to answer the question: did a prior email thread similar to the first email thread (402) result in issuing an invoice in the past?

The contract generator (108) then queries the financial management application (450) using the second set of entities (474). The contract generator (108) then queries the financial management application (450) using "Mike Jones" (406) and "sweater" (408) to seek additional prior invoices, with timestamps comparable to the timestamps of the messages in the prior email thread (472). However, no such additional prior invoices are found, Therefore, the contract generator (108) reduces the invoice score (438), as shown in FIG. 4E, of the proposed invoice (430), as a result of the failure to generate an invoice corresponding to the prior email thread (472) that shares similarities with the first email thread (402).

In an alternate scenario, an additional prior invoice is found based on the second set of entities (474), with a timestamp comparable to the timestamps of the messages in the prior email thread (472). In this alternate scenario, the various scores of the proposed invoice (430) are adjusted based on the contents of the additional prior invoice. For example, the element value score (434A) corresponding to element value "sweater" (432A) would be further increased based on the additional prior invoice that included the element value "sweater" (432A).

Once the proposed invoice (430) has been generated, and any adjustments have been made based on prior invoices (458) obtained from the financial management application (450) and/or prior email threads (472) of the email system (400), the contract generator (108) sends the proposed invoice (430) to the GUI (110), if the invoice score (438) exceeds a contract score threshold. In this case, the invoice score (438) exceeds the contract score threshold of 0.5, so the proposed invoice (430) is sent to the GUI (110). The element values (432A-432E) of the proposed invoice (430) are displayed in the GUI when the corresponding element value score (434A-434E) exceeds an element value score threshold. In this case, the element value score threshold is 0.6, so element value "jacket" (432B), whose element value score (434B) is 0.4, is not displayed.

Next, feedback is received by the contract generator (108) from the user via the GUI (110). The feedback includes adjustments to various element values (432A-432E) and attribute values (436A-436H) of the proposed invoice (430) (e.g., adjustments to prices, quantities, discounts, due dates, etc.). The feedback may also include accepting (e.g., issuing) or rejecting the proposed invoice (430).

Figure 4G:
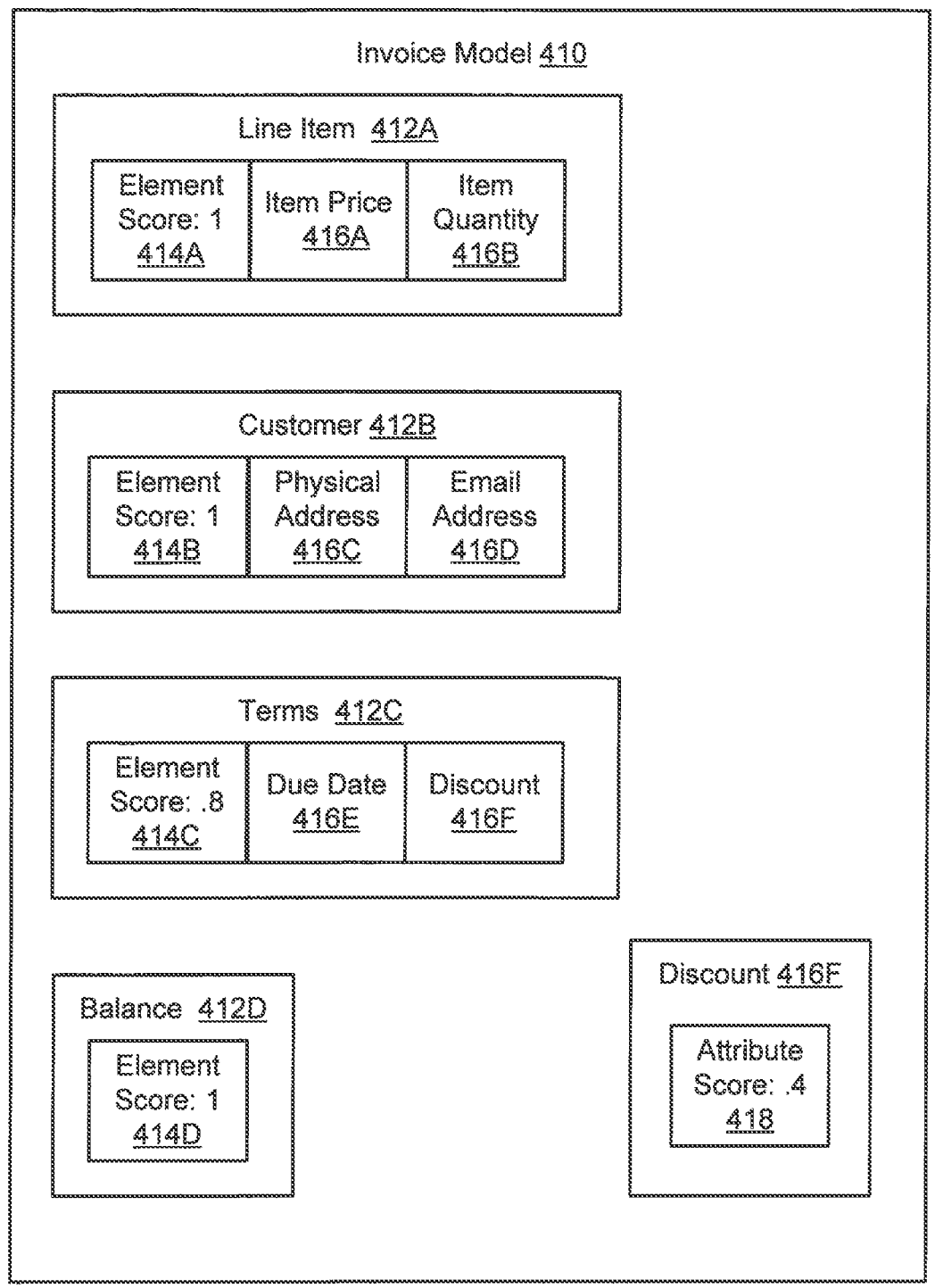

The contract generator (108) modifies the invoice model (410) in response to the feedback when the feedback modifies the structure of the proposed invoice (430). In this scenario, due to business pressures, the user decides to rescind the discount, and the feedback removes the discount attribute (436H) from the element value "terms" (432D). In response, the contract generator reduces the corresponding attribute score (424) of the discount attribute (422) of the element "terms" (412C) in the invoice model (410), as shown in FIG. 4G. That is, as a result of the feedback, the invoice model (410) is retrained to reduce the likelihood of including the discount attribute (422) in future proposed invoices (430) based on the invoice model (410).

In another alternate scenario, the feedback adds an element or attribute to the proposed invoice (430), in which case the contract generator (108) adds the corresponding element or attribute to the invoice model (410).

Figure 5A:
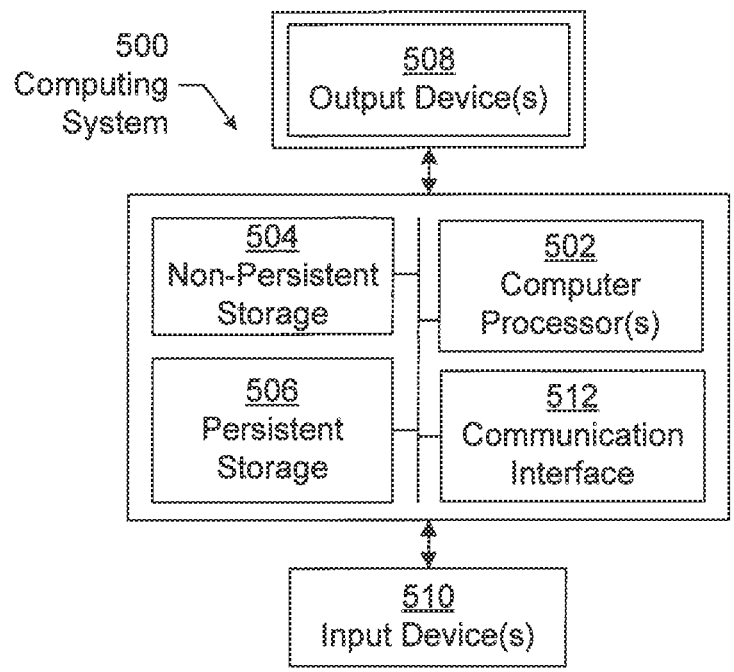
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor (s), is configured to perform one or more embodiments disclosed herein.

Figure 5B:
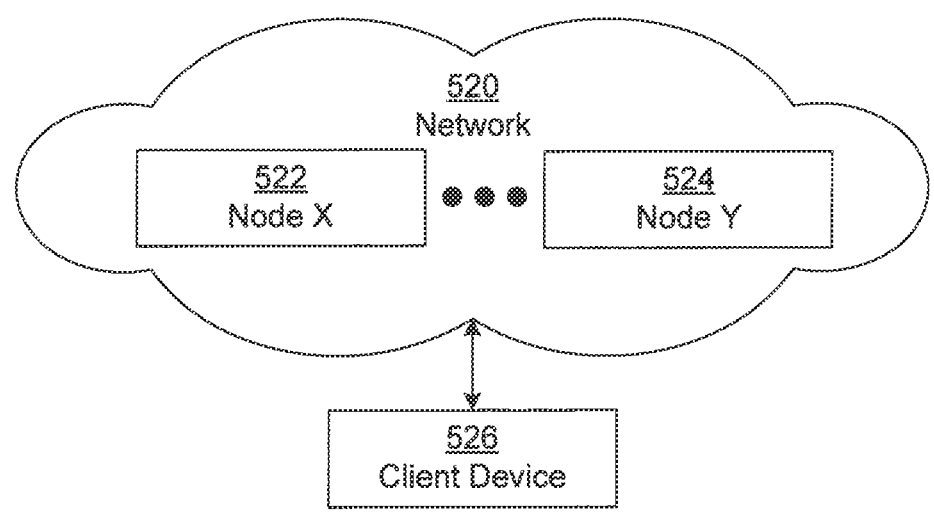

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center, By way of another example, the node may correspond to a computer processor or micro-core of a computer processor with shared memory and/or resources.

The nodes (e.g., node X (522), node Y (524)) in the network (520) may be configured to provide services for a client device (526), For example, the nodes may be part of a cloud computing system. The nodes may include functionality to receive requests from the client device (526) and transmit responses to the client device (526). The client device (526) may be a computing system, such as the computing system shown in FIG. 5A, Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device, Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database, A database is a collection of information configured for ease of data retrieval, modification, re-organization, and deletion, Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods, Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

The above description of functions present only a few examples of functions performed by the computing system of FIG. 5A and the nodes and/or client device in FIG. 5B, Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   extracting a first set of entities from a first portion of an unstructured data source associated with a user, wherein the unstructured data source comprises exchanged natural language messages;
   obtaining, based on the first set of entities from a machine learning model, a contract model comprising a set of elements and a contract type;
   generating, by applying the contract model to the first set of entities, a proposed contract comprising a contract score and, for each element of the set of elements, a set of element values, wherein each element value of the set of element values comprises an element value score, and wherein the element value score indicates a likelihood of a corresponding element value being included in the proposed contract;
   identifying a structured data source associated with the user, wherein the structured data source comprises structured data that represents relationships among a plurality of entities stored in the structured data source, and wherein the plurality of entities comprises at least the first set of entities;
   obtaining, from the structured data source, structured data corresponding to the first set of entities;
   correlating the structured data with a first element value of the proposed contract;
   modifying, by applying the contract model to the structured data, the element value score of the first element value to improve an accuracy of the proposed contract;
   displaying the proposed contract in a graphical user interface (GUI) when the contract score of the proposed contract exceeds a contract score threshold, wherein displaying the proposed contract comprises displaying each element value of the set of element values when the element value score of the element value exceeds an element value score threshold;
   receiving, from the user, feedback regarding a second element value of the proposed contract; and
   modifying the contract model in response to the feedback.

2. The method of claim 1, further comprising:
   extracting, from a second portion of the unstructured data source, a second set of entities corresponding to the first set of entities; and
   modifying, by applying the contract model to the second set of entities and the structured data, the element value score of the first element value.

3. The method of claim 1, further comprising:
   obtaining, from a position of a slider of the GUI, a weighting factor associated with the structured data source, wherein the position is set by the user,
   wherein modifying the first element value score is based on the weighting factor.

4. The method of claim 1, further comprising:
   obtaining, from a profile of the user, a weighting factor associated with the structured data source,
   wherein modifying the first element value score is based on the weighting factor.

5. The method of claim 1,
   wherein each element of the set of the elements comprises a set of attributes,
   wherein the proposed contract further comprises, for each attribute of the set of attributes, a set of attribute values,
   wherein each attribute value of the set of attribute values comprises an attribute value score,
   the method further comprising:
      correlating the structured data with an attribute value of the proposed contract; and
      modifying, by applying the contract model to the structured data, the attribute value score of the attribute value.

6. The method of claim 1, further comprising:
   modifying, by applying the contract model to the structured data, the contract score of the proposed contract.

7. The method of claim 1, wherein identifying the structured data source is based on the contract type.

8. The method of claim 1, further comprising:
   executing the machine learning model to generate the contract model.

9. The method of claim 8, further comprising:
   prior to executing the machine learning model, training the machine learning model using a plurality of unstructured data sources similar to the unstructured data source.

10. A system, comprising:
a computer processor;
an unstructured data source associated with a user;
a set of structured data sources associated with the user, wherein the set of structured data sources comprises a first structured data source, the first structured data source comprising a structured data representing relationships among a plurality of entities stored in the first structured data source;
a natural language processor executing on the computer processor configured to:
extract a first set of entities from a first portion of the unstructured data source;
a contract generator executing on the computer processor configured to:
obtain, based on the first set of entities, a contract model comprising a set of elements and a contract type;
generate, by applying the contract model to the first set of entities, a proposed contract comprising a contract score and, for each element of the set of elements, a set of element values, wherein each element value of the set of element values comprises an element value score;
obtain, from the first structured data source, the structured data corresponding to the first set of entities;
correlate the structured data with a first element value of the proposed contract; and
modify, by applying the contract model to the structured data, the element value score of the first element value to improve an accuracy of the proposed contract; and
a repository configured to store at least the contract model and the proposed contract; and
a graphical user interface (GUI) executing on the computer processor configured to:
display the proposed contract when the contract score of the proposed contract exceeds a contract score threshold, wherein displaying the proposed contract comprises displaying each element value of the set of element values when the element value score of the element value exceeds an element value score threshold; and
receive, from the user, feedback regarding a second element value of the proposed contract,
wherein the contract generator is further configured to:
modify the contract model in response to the feedback.

11. The system of claim 10,
wherein the natural language processor is further configured to:
extract, from a second portion of the unstructured data source, a second set of entities corresponding to the first set of entities, and
wherein the contract generator is further configured to:
modify, by applying the contract model to the second set of entities and the structured data, the element value score of the first element value.

12. The system of claim 10, wherein the GUI is further configured to:
obtain, from a position of a slider, a weighting factor associated with the first structured data source, wherein the position is set by the user,
wherein modifying the first element value score is based on the weighting factor.

13. The system of claim 10, further comprising a profile of the user, wherein the contract generator is further configured to:

obtain, from the profile, a weighting factor associated with the first structured data source,
wherein modifying the first element value score is based on the weighting factor.

14. The system of claim 10,
wherein each element of the set of the elements comprises a set of attributes,
wherein the proposed contract further comprises, for each attribute of the set of attributes, a set of attribute values,
wherein each attribute value of the set of attribute values comprises an attribute value score,
wherein the contract generator is further configured to:
correlate the structured data with an attribute value of the proposed contract; and
modify, by applying the contract model to the structured data, the attribute value score of the attribute value.

15. A non-transitory computer readable medium comprising instructions that, when executed by a processor, perform a method comprising:
extracting a first set of entities from a first portion of an unstructured data source associated with a user, wherein the unstructured data source comprises exchanged natural language messages;
obtaining, based on the first set of entities, a contract model comprising a set of elements and a contract type;
generating, by applying the contract model to the first set of entities, a proposed contract comprising a contract score and, for each element of the set of elements, a set of element values, wherein each element value of the set of element values comprises an element value score, and wherein the element value score indicates a likelihood of a corresponding element value being included in the proposed contract;
identifying a structured data source associated with the user, wherein the structured data source comprises structured data that represents relationships among a plurality of entities stored in the structured data source, and wherein the plurality of entities comprises at least the first set of entities;
obtaining, from the structured data source, structured data corresponding to the first set of entities;
correlating the structured data with a first element value of the proposed contract;
modifying, by applying the contract model to the structured data, the element value score of the first element value to improve an accuracy of the proposed contract;
displaying the proposed contract in a graphical user interface (GUI) when the contract score of the proposed contract exceeds a contract score threshold, wherein displaying the proposed contract comprises displaying each element value of the set of element values when the element value score of the element value exceeds an element value score threshold;
receiving, from the user, feedback regarding a second element value of the proposed contract; and
modifying the contract model in response to the feedback.

16. The non-transitory computer readable medium of claim 15, wherein the method further comprises:
extracting, from a second portion of the unstructured data source, a second set of entities that corresponds to the first set of entities;
correlating the third set of entities with the first element value; and
modifying, by applying the contract model to the second set of entities and the structured data, the element value score of the first element value.

17. The non-transitory computer readable medium of claim 15,
- wherein each element of the set of the elements comprises a set of attributes,
- wherein the proposed contract further comprises, for each attribute of the set of attributes, a set of attribute values,
- wherein each attribute value of the set of attribute values comprises an attribute value score, and
- wherein the method further comprises:
    - correlating the structured data with an attribute value of the proposed contract; and
    - modifying, by applying the contract model to the structured data, the attribute value score of the attribute value.

* * * * *